(12) United States Patent
Thurmond et al.

(10) Patent No.: US 7,830,272 B2
(45) Date of Patent: Nov. 9, 2010

(54) REMOTE DISPLAY CHAIN FOR MULTIPLE USER INTERFACE APPLICATIONS

(76) Inventors: M. Jason Thurmond, 1306 River Rock Blvd., Murfreesboro, TN (US) 37129; Avery D. Long, 246 Avian La., Madison, AL (US) 35758

( * ) Notice: Subject to any disclaimer, the term of this patent is extended or adjusted under 35 U.S.C. 154(b) by 890 days.

(21) Appl. No.: 11/731,982

(22) Filed: Apr. 2, 2007

(65) Prior Publication Data
US 2008/0238712 A1  Oct. 2, 2008

(51) Int. Cl.
*G08B 23/00* (2006.01)
(52) U.S. Cl. ............... 340/870.02; 702/60; 705/412
(58) Field of Classification Search ............ 340/870.02–870.03; 702/60; 705/412
See application file for complete search history.

(56) References Cited

U.S. PATENT DOCUMENTS 6,956,510 B1 * 10/2005 He et al. .............. 341/58
7,317,404 B2 * 1/2008 Cumeralto et al. ..... 340/870.02
7,623,043 B2 * 11/2009 Mizra et al. ............ 340/870.02
7,688,220 B2 * 3/2010 Bovankovich et al. . 340/870.02
2005/0190074 A1   9/2005 Cumeralto
2006/0085148 A1   4/2006 Aihara

FOREIGN PATENT DOCUMENTS

WO        WO036874 A    5/2003

* cited by examiner

*Primary Examiner*—Albert K Wong

(57) ABSTRACT

A multi-master serial bus that connects multiple utility monitoring devices with multiple remote electronic display units. The display units include an $I^2C$ microprocessor with an integrated LCD controller for controlling an LCD display and a set of buttons for changing what is displayed on the LCD display. They also include an I/O to $I^2C$ driver for sending button key presses to the remote monitoring device, which communicates the requested data to be displayed back to the display unit via the multi-master serial bus. Each remote electronic display unit has a unique address assigned to it, and when a user input is detected on the $I^2C$ bus by the utility monitoring device, the controller in the utility monitoring device sends monitored data to the detected address for display on the remote electronic display unit.

20 Claims, 5 Drawing Sheets

REMOTE DISPLAY CHAIN FOR MULTIPLE USER INTERFACE APPLICATIONS

FIELD OF THE INVENTION

The present invention relates generally to utility monitoring systems and devices and, more particularly, to a power monitoring device that facilitates communication between multiple metering devices and multiple display units.

BACKGROUND OF THE INVENTION

Since the introduction of electrical power distribution systems in the late 19th century, there has been a need to monitor their operational and electrical characteristics. The ability to collect, analyze, and respond to information about an electrical power system can improve safety, minimize equipment loss, and ultimately save time and money. To that end, monitoring devices were developed to measure and report such information. These monitoring devices may have a separate user interface for reporting such information from the monitoring device itself. The user interface typically includes a display that is remote from the main monitoring device. The remote display beneficially allows the monitoring device with the actual electrical connections to be safely moved a distance away from the user and provides installation flexibility by mounting elsewhere the main monitoring unit, which is physically larger than the remote user interface.

Traditional remote displays have been driven by RS-232 or RS-485 transceivers. RS-232-type transceivers have a single-point interface and are not multi-master. RS-232 transceivers limit connection from one meter to one display. Therefore, if a user wishes to monitor readings from multiple metering devices, it is necessary to purchase and install multiple display units. An RS-485 transceiver is multi-drop, but typically has a single master. A problem that arises in a specific application of multi-tenant monitoring environment (energy monitoring in apartments or high-rise condominiums) is the inability to use a single display to monitor multiple circuits in a cost-effective way.

Furthermore, in tenant monitoring, normally the display must be isolated from the electrical circuit via galvanic or optical isolation. For RS-485 transceivers, this means that three wires must be isolated. Additionally, traditional remote displays driven by RS-232 or RS-485 can transmit data only at speeds up to 100 kbit/s.

Furthermore, these traditional monitoring systems are limited in their flexibility because of the one meter to one display or single master limitation. A user cannot simply install only those devices which he wishes to utilize because of these limitations.

There is thus a need for a lower cost for remote displays. There is also a need for improved scalability options for remote displays. There is also a need for single display able to read on multiple metering devices. There is also a need for multiple displays to read on a single metering device. Finally, there is a need for multiple displays to display data from multiple metering devices. Aspect of the present invention addresses these and other needs.

SUMMARY OF THE INVENTION

Briefly, according to an embodiment of the present invention, a remote display chain comprises: a multi-master serial bus; at least one metering device coupled to the multi-master serial bus and including a sensor for sensing characteristics of a utility monitored by the at least one metering device and a microprocessor programmed to communicate monitored data indicating the characteristics via an interface; and a remote display unit coupled to the multi-master serial bus and including an input panel coupled to an input-output port that outputs user input data from the input panel to the multi-master serial bus and at least one electronic display for displaying first data indicative of at least one of the characteristics associated with the monitored data received from the at least one metering device, the at least one electronic display having an associated address, wherein the at least one metering device is programmed to respond to the user input data and send over the multi-master serial bus second data indicative of at least another one of the characteristics associated with the monitored data to the address of the at least one electronic display associated with the remote display unit.

The at least one electronic display may be a plurality of electronic displays. Each of the plurality of electronic displays may be programmed via addresses to receive respective display commands from respective ones of the at least one metering device. The data may be communicated between the at least one metering device and the at least one electronic display at speeds of at least 100 kilobits per second. The characteristics may be power-related characteristics and include at least one of volts, amperes, watts, energy, demand, or frequency. The at least one electronic display may be an organic light emitting diode display. The remote display unit may be programmed to select which portion of the monitored data to be displayed on the at least one electronic display. The remote display unit may be programmed to select the type of the characteristics to be displayed on the at least one electronic display.

According to another aspect of the present invention, a remote display chain comprises: a plurality of metering devices, each including a sensor for sensing characteristics of a utility and a microprocessor programmed to communicate monitored data indicating at least some of the characteristics; a plurality of display units in remote communication with the plurality of metering devices, each of the plurality of display units including an input panel that outputs user-input signals indicative of user inputs on the input panel and an electronic display for displaying the monitored data and having a unique address assigned to the electronic display, wherein each of the plurality of metering devices responds to the at least one of the user-input signals by sending the monitored data to the unique address associated with the display unit that outputted the at one of the user-input signals, the electronic display associated with the display unit that outputted the at least one of the user-input signals displaying the monitored data; and a serial bus connecting the plurality of display units to the plurality of metering devices.

The plurality of display units may be programmed to receive at least some of the monitored data from any one or more of the plurality of metering devices via the serial bus. The monitored data may be communicated between the plurality of metering devices and the plurality of display units at speeds of at least 100 kilobits per second via the serial bus. The characteristics may include at least one of volts, amperes, watts, energy, demand, or frequency measurements. At least some of the plurality of electronic displays may be liquid crystal displays or light emitting diode displays. Each of the plurality of display units may be programmed to select portions of the monitored data to be displayed on respective ones of the plurality of electronic displays. Each of the plurality of display units may be programmed to select the type of characteristics to be displayed on their respective electronic display.

According to another aspect of the present invention, a method for viewing electrical circuit information comprises: receiving, via a multi-master serial bus, a command from a monitoring device to display data indicative of characteristics relating to a utility being monitored by the monitoring device; communicating the data from the monitoring device over the multi-master serial bus; displaying the data received from the monitoring device on an electronic display having a uniquely assigned address associated therewith.

The characteristics may include at least one of volts, amperes, watts, energy, demand, or frequency. The command may be sent to the monitoring device at speeds of at least 100 kbit/second. The electronic display may be a liquid crystal display or a light emitting diode display. The method may further comprise: receiving, via the multi-master serial bus, a second command from a second monitoring device to send second data indicative of characteristics relating to a utility being monitored by the second monitoring device to the assigned address associated with the electronic display; communicating the second data from the second selected metering device over the multi-master serial bus; and displaying the second data received on the electronic display.

BRIEF DESCRIPTION OF THE DRAWINGS

The foregoing and other advantages of the invention will become apparent upon reading the following detailed description and upon reference to the drawings.

Figure 1:
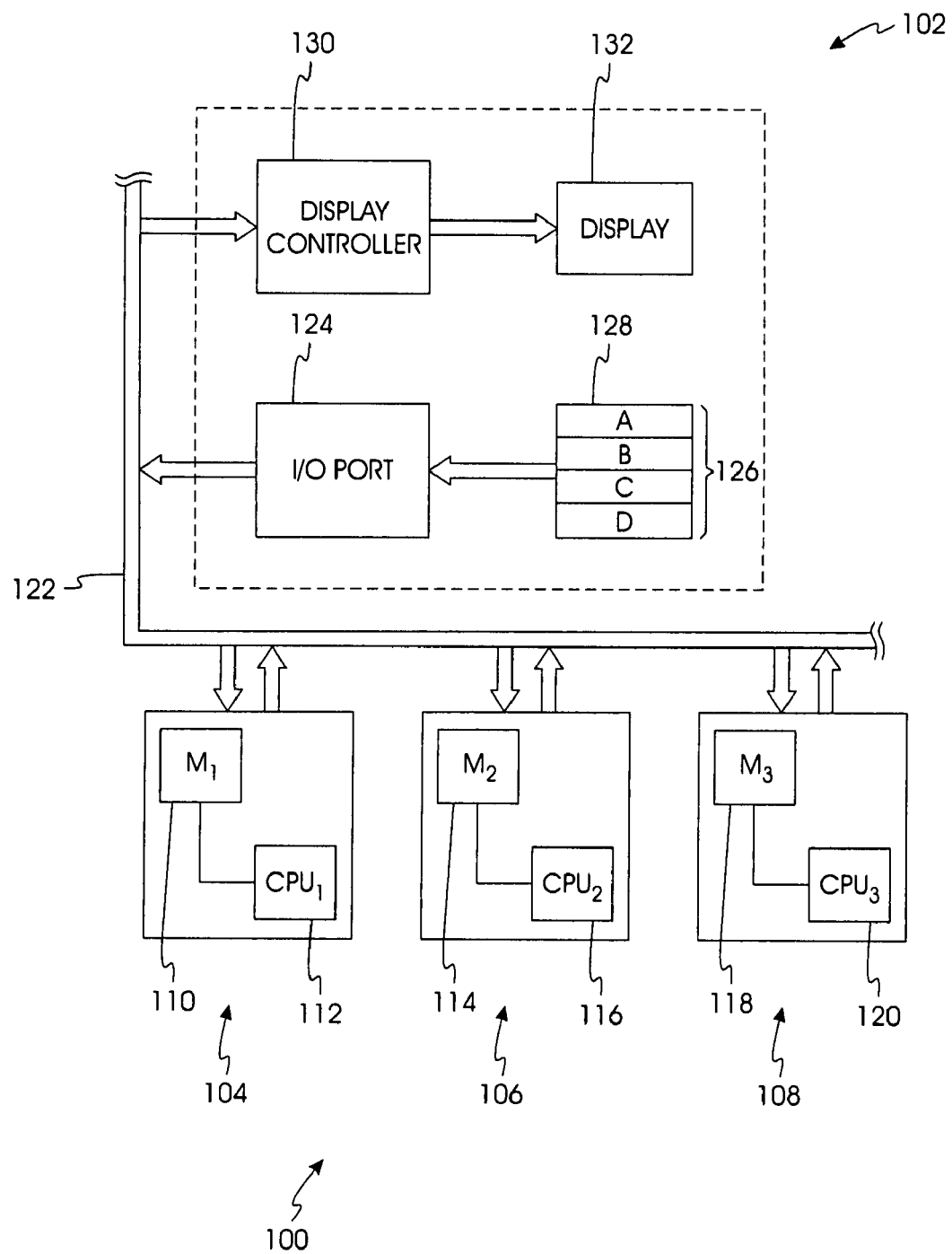
FIG. 1 is a functional block diagram of a remote display chain according to an aspect of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to FIG. 1, a block diagram of a remote display chain 100 is generally shown. The remote display chain 100 includes a remote display unit 102, a first metering device 104, a second metering device 106, a third metering device 108, and a serial bus 122. The first metering device 104 includes an electrical meter 110 and a microprocessor 112. The second metering device 106 includes an electrical meter 114 and a microprocessor 116. The third metering device 108 includes an electrical meter 118 and a microprocessor 120.

As used herein, a metering device refers to any system element or apparatus with the ability to sample, collect, or measure one or more operational characteristics or parameters of a utility system. In this example, the metering devices 104, 106, and 108 can be based on a PowerLogic® Series 3000/4000 Circuit Monitor or a PowerLogic® ION7550/7650 Power and Energy Meter available from Schneider Electric, or any other suitable monitoring device such as a circuit breaker, a metering device, or a power meter. The operational characteristics can include voltage, current, power, relative phase, and other relevant characteristics of a utility. The utility can be any of water, air, gas, energy, and steam (WAGES). The microprocessors 112, 116, and 120 can each operate in an I$^2$C (inter-integrated circuit) mode, as will be explained below. The microprocessors 112, 116, and 120 are programmed to process instructions received from other devices on the remote display chain 100. In this example, the remote display unit 102 includes an I/O port 124, an input panel 126, display controller 130, and electronic display 132.

The microprocessors 112, 116, and 120 are programmed to output display commands to the display controller 130, which delivers the display commands to the electronic display 132.

In this example, the serial bus 122 is an Inter-Integrated Circuit Bus (I$^2$C or IIC). An I$^2$C bus is a multi-master serial bus, which makes multiple master nodes on the bus possible. A bus master is the device that drives the bus and sends bus control signals. All communications between input-output (I/O) devices on a bus must include a bus master to send appropriate control signals. Because the I$^2$C bus is used in this example, there is no single designated bus master. Each of the metering devices 104, 106, and 108 is capable of being a bus master, as well as an I/O port 124 with I$^2$C drivers for sending back button 126 key presses to the main host 104, 106, 108. The I$^2$C protocol has built-in arbitration, which means that signals sent from multiple masters are negotiated such that they do not interfere with each other. Thus, any of these devices can initiate communication to another device. If there is an immediate need (such as an emergency alarm) for a user accessing the remote display unit 102 to see information relating to a particular meter, the meter can immediately display such information without user input. Additionally, a multi-master bus allows for a single display to display information from multiple metering devices.

The I$^2$C bus has several modes, including a low speed mode (10 kbit/s), standard mode (100 kbit/s), fast mode (400 kbit/s), and high speed mode (3.4 Mbit/s).

Each of the devices on the I$^2$C bus includes a unique address. These addresses allow each device to process only the data that is associated with its address. These addresses can be set by the user on the remote display unit 102 through a hardware setting via jumpers or dip switches or some other hardware implementation. Alternatively, the user can dynamically change the address of an individual device, so the user can install a switch that changes the hardware of an individual device. The I$^2$C standard allows for up to 255 devices on a bus. Using I$^2$C as the backplane allows the remote display unit 102 to read and communicate with multiple devices such as the metering devices 104, 106, and 108. In this example, the display controller 130, the I/O port 124, and each of the metering devices 104, 106, and 108 have its own unique I$^2$C address. For example, the metering devices 104, 106, and 108 and the I/O port 124 could occupy I$^2$C addresses 1-4 and the display controller 130 is at address 5.

Figure 2:
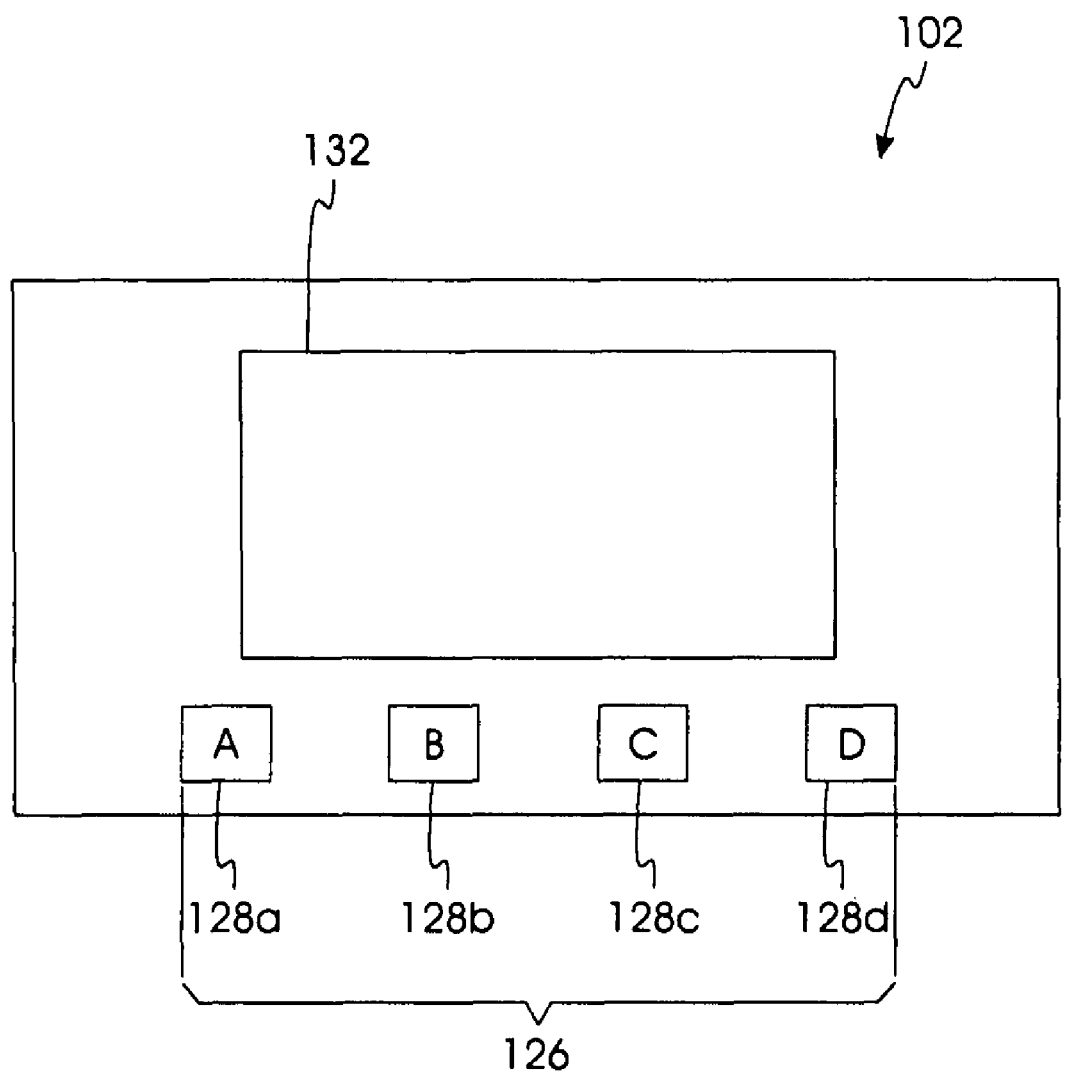
FIG. 2 is a front view of a remote display unit according to an aspect of the present invention.

Turning now to FIG. 2, the remote display unit 102 of FIG. 1 is generally shown. The remote display unit 102 includes the electronic display 132 and the input panel 126 of FIG. 1. In this example, the input panel includes buttons 128a, 128b, 128c, and 128d. The electronic display 132 may be a vacuum florescent display (VFD), liquid crystal display (LCD), organic LED (OLED) display, plasma display, field emission display, digital micromirror display (DMD), dot matrix display, or other display type.

In FIG. 1, the I/O port 124 is a Philips PCA95056 40-bit I$^2$C bus I/O port. This I/O port is I$^2$C-compatible and accepts 40 bits than can be set to input or output. In this example, only 4 bits are being utilized through the buttons 128a, 128b, 128c, and 128d. However, in other implementations, more I/O bits can be set depending upon the number of I/O devices connected to the I/O port 124, and include more I/O ports on the same remote display chain as each I/O port can hold a unique address on the I²C bus. The buttons 128a, 128b, 128c, and 128d can be pushed by the user to change display information on the electronic display 132. Once a button is pushed, the I/O port 124 sends a read command to another device. The other device may simply poll for button presses from the remote display unit 102. For instance, if the user is sending a request that information from metering device 106 be displayed on the electronic display 132, the I/O port 124 sends a request to the metering device 106 to output data to the display controller 130. The buttons 128a, 128b, 128c, and 128d can be either single-touch or menu-driven. For example, a user can press buttons 128a, 128b, 128c, and 128d to show display information for only the metering device 104 on the electronic display 132. Conversely, a user can press buttons 128a, 128b, 128c, and 128d to show only voltage information, for all three metering devices 104, 106, and 108 on the electronic display 132. Because the I/O port 124 is a master on the remote display chain 100, it can initiate a read sequence on any and all of the metering devices 104, 106, and 108, and this information is then sent to the display controller 130.

Alternately, the remote display unit 102 may not have the buttons 128. In this implementation, the display 132 displays preset monitored data or monitored data that is scrolled across the display 132. The monitoring device 104 sends to the remote display unit 102 a single power-related characteristic or a set of preset characteristics that are displayed on the display 132 without any input from the user.

The display controller 130 has a unique address on the serial bus 122. Ideally, the display controller 130 is a low cost microprocessor with an integrated LCD controller. In this example, the display controller 130 also contains an integrated LCD driver, such as the Philips PCF8562 Universal LCD Driver. The display controller 130 sends display information to the electronic display 132, and drives the serial bus 122 directly.

In an alternative example, the remote display chain does not utilize the display controller 130, and receives display information directly from one of the metering devices 104, 106, or 108. In such an example, the address of the electronic display driver is dynamically changed to read between metering devices with a single display, such as the display 132. The I²C data is sent out continuously from the master metering devices, but the electronic display driver will only process the data from the address to which it is presently set.

Figure 3:
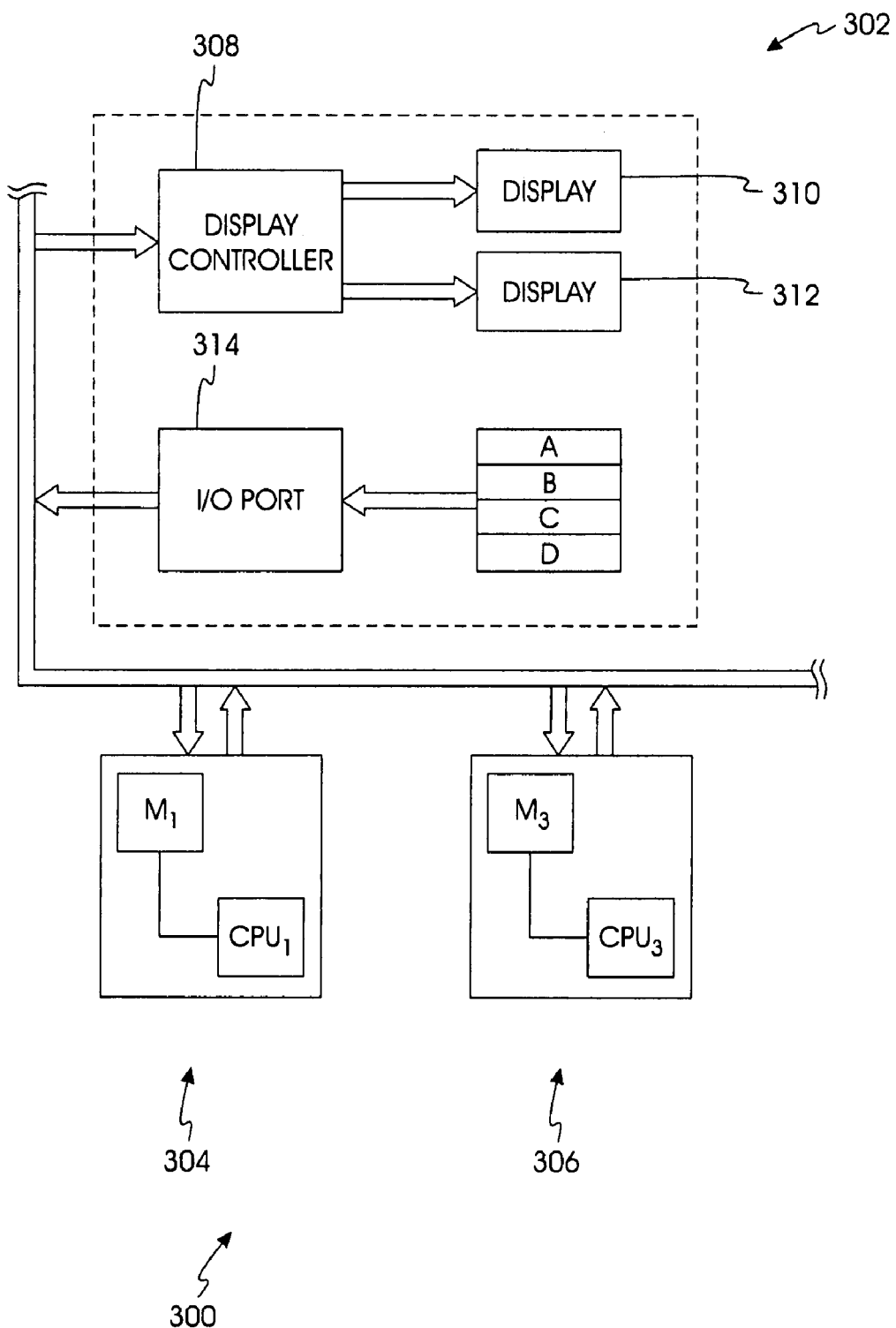
FIG. 3 is a functional block diagram of a remote display chain according to an aspect of the present invention.

Turning now to FIG. 3, a block diagram of an alternative example of a remote display chain 300 is shown. In this example, the remote display chain 300 includes metering devices 304 and 306 as well as electronic displays 310 and 312. A display controller 308 is programmed to send specific display data to each of the electronic displays 310 and 312. For instance, the display controller 308 can be programmed to send display data associated with a first metering device 304 to the electronic display 310, and to send display data associated with a second metering device 306 to the electronic display 312. The display controller 308 can also be programmed to send only certain types of data, such as voltage data, to the electronic display 308. Alternatively, the display controller 308 can be programmed to receive display commands from the user, through an I/O port 314, so that the user can customize the display units 310 and 312. The remote display chain 300 can include more than two displays and/or two meters, and can also include more than one I/O port 314, in order to fit the user's needs. There could be up to 64 individual displays on the same chain.

The address selection on the remote display unit 102 sets the address for the LCD driver(s) or microcontroller 130 with integrated LCD controller and the I/O port device 124 based on an offset of the address selection. Thus, all I²C devices connected to the bus 122 have individual addresses but the address selection will be the base address and the other I²C devices are addressed from that base address. The number of I²C drivers (or I²C microcontroller addresses) on the remote display unit 102 are hardwired to ensure different addresses with the unit 102.

There are several advantages in implementing a multi-master serial bus for a remote display chain. The multi-master design allows for extreme flexibility in designing a remote monitoring display chain, as the user can utilize up to 255 devices on a single chain based on the hardware configuration of the remote display unit 102 (which may or may not include the I/O port 124 and the buttons 128 for communicating button presses). The user can therefore set up several metering devices to one display, several displays to a single metering device, or several metering devices to several displays using the multi-master serial bus.

Because the I²C only requires two wires to communicate, it can be isolated with minimal complexity. Furthermore, I²C allows for data transfer at speeds of over 1 Mbit/s.

There are many I/O devices where one could read push buttons without writing any code directed towards networking devices, because the I²C protocol has built-in arbitration and addressing schemes. The I²C protocol is also beneficial for adding on peripherals later such as meters for temperature reading, additional memory, or even more communication ports because of I²C bridge devices such as I²C to universal asynchronous receiver/transmitter (UART), I²C to Serial Peripheral Interface Bus (SPI), and so forth.

Figure 4A:
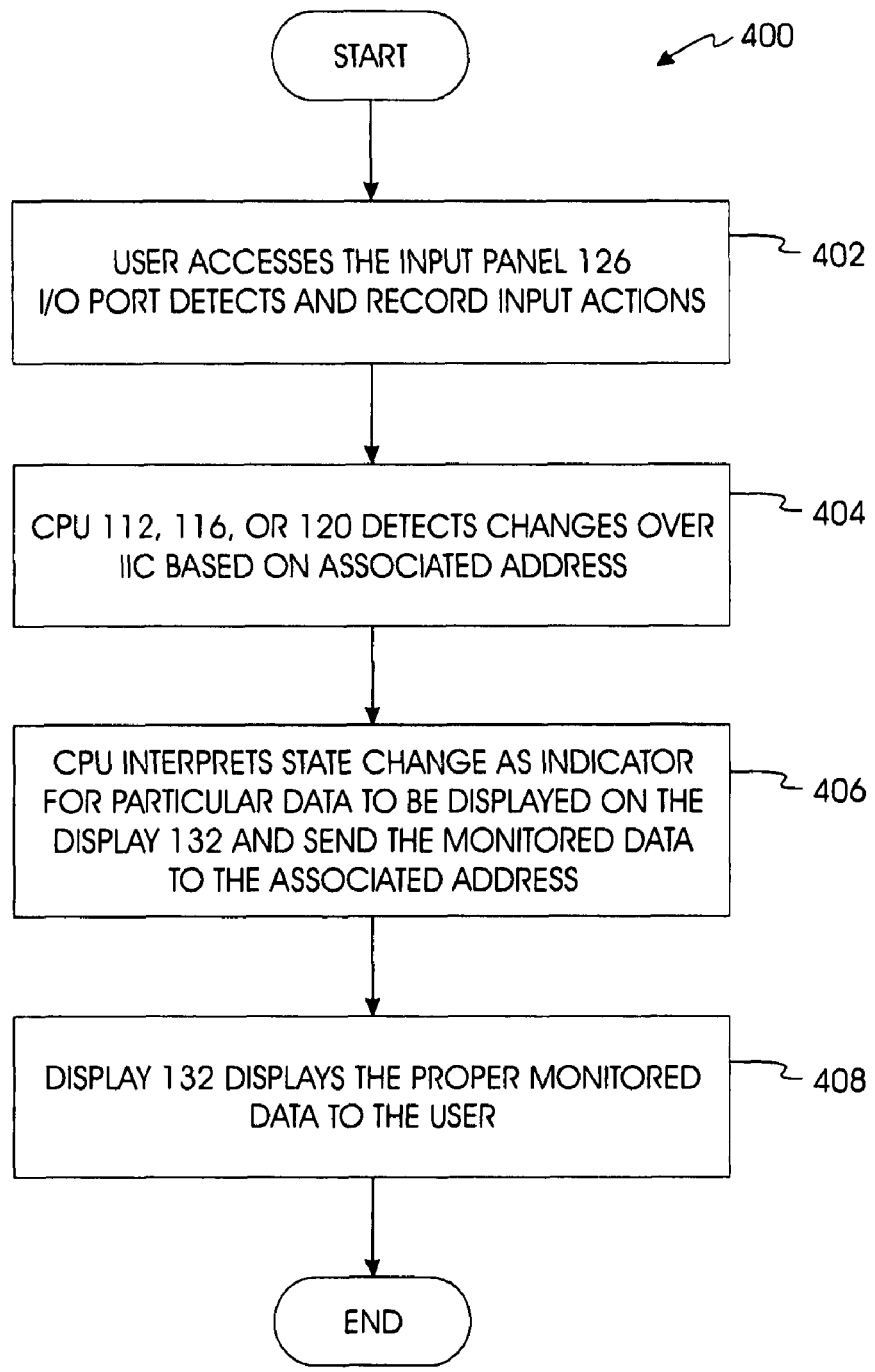
FIGS. 4A and 4B are flowcharts of two exemplary processes for altering and displaying the monitored data displayed on a remote display unit according to an aspect of the present invention.
Figure 4B:
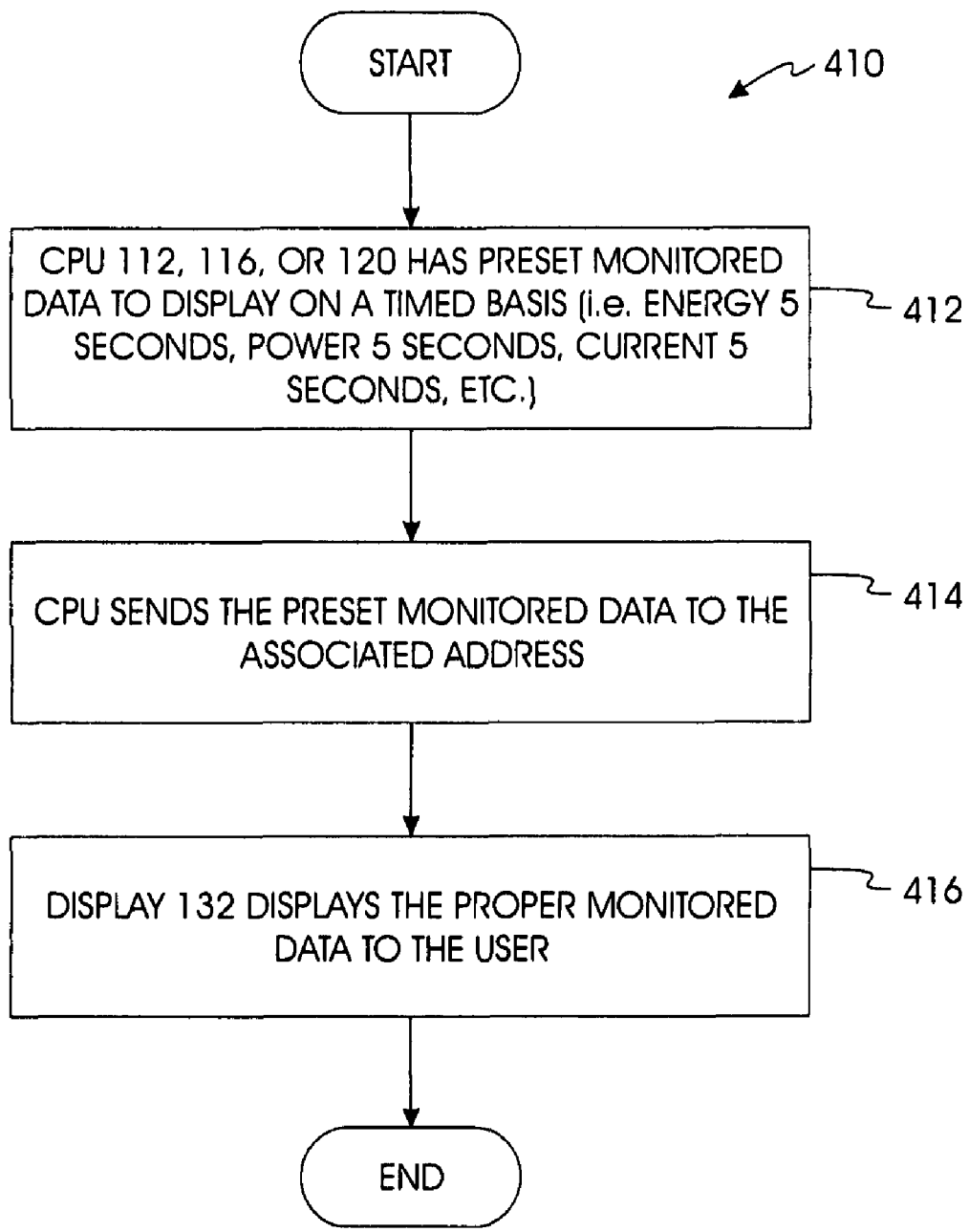

FIGS. 4A and 4B are representative flowcharts for utility-related information on the remote display chain of FIG. 1. In this example, machine readable instructions carrying out the process comprise an algorithm for execution by: (a) a processor, (b) a controller, and/or (c) any other suitable processing device. The algorithm may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it maybe implemented by an application specific integrated circuit (ASIC), a programmable logic device (PLD), a field programmable logic device (FPLD), discrete logic, etc.). Also, some or all of the machine readable instructions represented by the flowchart of FIGS. 4A-4B may be implemented manually. Further, although the example algorithm is described with reference to the flowchart illustrated in FIGS. 4A-4B, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Two implementations are shown in FIGS. 4A and 4B. According to a first implementation 400 shown in FIG. 4A, the information displayed on the display 132 is driven by a user selection indicating the type of information desired to be displayed on the display 132. In the second implementation 410 shown in FIG. 4B, the monitoring device 104, 106, 108 determines what is displayed on the displays of the remote display units 102 independent of any user input on the input panel 126. In the implementation 410, the remote display units 102 may lack an input panel.

According to the first implementation 400, a user access the input panel 126 and presses one of the buttons 128. The I/O port 124 detects the button press and records the input action corresponding to the button press (402). The I/O port 124 outputs a signal corresponding to the button press to the I²C bus 122. The CPUs 112, 116, 120 detect changes on the bus 122 based on the associated address transmitted on the bus 122 with the changes (404). The CPU interprets the state change as an indicator for particular data to be displayed on the display 132 and sends the appropriate monitored data to the associated address (406). The display 132 displays the appropriate monitored data to the user (408).

According to the second implementation 410 shown in FIG. 4B, the CPU 112, 116, 120 receives preset monitored data to be displayed on a periodic basis, such as energy for five seconds, power for five seconds, current for five seconds, and so forth (412). The CPU sends the preset monitored data to the address associated with the remote display unit 102. The preset data may first include energy data followed by power data followed by current data and so forth. The CPU may also multiplex preset data to multiple remote display units. For example, the CPU 112 may send energy data to the address associated with the remote display unit 102, then send power data to an address associated with another remote display unit (not shown) connected to the bus 122. Each display displays the preset monitored data to the user (416) until different preset data is received from the corresponding monitoring device.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A remote display chain, comprising:
a multi-master serial bus;
at least one metering device coupled to the multi-master serial bus and including a sensor for sensing characteristics of a utility monitored by the at least one metering device and a microprocessor programmed to communicate monitored data indicating the characteristics via an interface; and
a remote display unit coupled to the multi-master serial bus and including an input panel coupled to an input-output port that outputs user input data from the input panel to the multi-master serial bus and at least one electronic display for displaying first data indicative of at least one of the characteristics associated with the monitored data received from the at least one metering device, the at least one electronic display having an associated address, wherein the at least one metering device is programmed to respond to the user input data and send over the multi-master serial bus second data indicative of at least another one of the characteristics associated with the monitored data to the address of the at least one electronic display associated with the remote display unit.

2. The remote display chain of claim 1, wherein the at least one electronic display is a plurality of electronic displays.

3. The remote display chain of claim 2, wherein each of the plurality of electronic displays is programmed via addresses to receive respective display commands from respective ones of the at least one metering device.

4. The remote display chain of claim 1, wherein the data is communicated between the at least one metering device and the at least one electronic display at speeds of at least 100 kilobits per second.

5. The remote display chain of claim 1, wherein the characteristics are power-related characteristics and include at least one of volts, amperes, watts, energy, demand, or frequency.

6. The remote display chain of claim 1, wherein the at least one electronic display is an organic light emitting diode display.

7. The remote display chain of claim 1, wherein the remote display unit is programmed to select which portion of the monitored data to be displayed on the at least one electronic display.

8. The remote display chain of claim 1, wherein the remote display unit is programmed to select the type of the characteristics to be displayed on the at least one electronic display.

9. A remote display chain comprising:
a plurality of metering devices, each including a sensor for sensing characteristics of a utility and a microprocessor programmed to communicate monitored data indicating at least some of the characteristics;
a plurality of display units in remote communication with the plurality of Metering devices, each of the plurality of display units including an input panel that outputs user-input signals indicative of user inputs on the input panel and an electronic display for displaying the monitored data and having a unique address assigned to the electronic display, wherein each of the plurality of metering devices responds to the at least one of the user-input signals by sending the monitored data to the unique address associated with the display unit that outputted the at one of the user-input signals, the electronic display associated with the display unit that outputted the at least one of the user-input signals displaying the monitored data; and
a multi-master serial bus connecting the plurality of display units to the plurality of metering devices.

10. The remote display chain of claim 9, wherein the plurality of display units are programmed to receive at least some of the monitored data from any one or more of the plurality of metering devices via the multi-master serial bus.

11. The remote display chain of claim 9, wherein the monitored data is communicated between the plurality of metering devices and the plurality of display units at speeds of at least 100 kilobits per second via the multi-master serial bus.

12. The remote display chain of claim 9, wherein the characteristics includes at least one of volts, amperes, watts, energy, demand, or frequency measurements.

13. The remote display chain of claim 9, wherein at least some of the plurality of electronic displays are liquid crystal displays or light emitting diode displays.

14. The remote display chain of claim 9, wherein each of the plurality of display units is programmed to select portions of the monitored data to be displayed on respective ones of the plurality of electronic displays.

15. The remote display chain of claim 9, wherein each of the plurality of display units is programmed to select the type of characteristics to be displayed on their respective electronic display.

16. A method for viewing electrical circuit information via a plurality of monitoring devices, the method comprising:

receiving, via a multi-master serial bus, a command from one of the plurality of monitoring devices to display data indicative of characteristics relating to a utility being monitored by the monitoring device;

communicating the data from the monitoring device over the multi-master serial bus;

displaying the data received from the monitoring device on an electronic display having a uniquely assigned address associated therewith.

17. The method of claim 16, wherein the characteristics includes at least one of volts, amperes, watts, energy, demand, or frequency.

18. The method of claim 16, wherein the command is sent to the monitoring device at speeds of at least 100 kbit/second.

19. The method of claim 16, wherein the electronic display is a liquid crystal display or a light emitting diode display.

20. The method of claim 16, further comprising:

receiving, via the multi-master serial bus, a second command from a second monitoring device to send second data indicative of characteristics relating to a utility being monitored by the second monitoring device to the assigned address associated with the electronic display;

communicating the second data from the second selected metering device over the multi-master serial bus; and displaying the second data received on the electronic display.

* * * * *